United States Patent [19]

Korpel

[11] 3,716,659

[45] Feb. 13, 1973

[54] FREQUENCY DOMAIN IMAGE PROCESSING APPARATUS

[75] Inventor: Adrianus Korpel, Prospect Heights, Ill.

[73] Assignee: Zenith Radio Corporation, Chicago, Ill.

[22] Filed: April 9, 1971

[21] Appl. No.: 132,847

[52] U.S. Cl. ..............................178/7.3 D, 178/6.6 R

[51] Int. Cl...........H04n 1/22, H04n 3/02, H04n 5/44

[58] Field of Search ...........178/7.3 D, 6.6 R, DIG. 2; 346/74; 235/61.12 M; 179/1 SA

[56] References Cited

UNITED STATES PATENTS

| | | | |
|---|---|---|---|
| 3,109,058 | 10/1963 | Luhn | 178/6.6 R |
| 3,334,354 | 8/1967 | Mutschler | 178/6.6 R |
| 3,052,564 | 9/1962 | Kulesza | 235/61.12 M |
| 3,161,726 | 12/1964 | Todt | 178/7.3 D |
| 3,243,508 | 3/1966 | Sclar | 178/7.3 D |
| 3,389,218 | 6/1968 | Balamuth et al. | 178/6.6 R |
| 3,418,427 | 12/1968 | Jones | 178/6.6 R |
| 3,213,197 | 10/1965 | Hawkins | 179/1 SA |

*Primary Examiner*—Richard Murray
*Attorney*—John J. Pederson

[57] ABSTRACT

Images are recorded or reproduced by use of a bank of frequency-responsive mechanical resonators which may be arranged in a single row or in a plurality of rows. Within a row, the resonators are individually disposed at what correspond to different image element positions. As a result of response of the resonators, either in reflecting light or in making or responding to a record, the action of the resonators is correlated with a recording or reproducing medium so that either an image is produced or an electrical signal is developed that defines an image. Display may be either of the television or facsimile type. Whatever the particular mechanism of reproduction or recording, use is made of frequency-responsive mechanical resonators to define different image element positions in a frequency-domain image processing system.

17 Claims, 16 Drawing Figures

Inventor
Adrianus Korpel
By [signature]
Attorney

Inventor
Adrianus Korpel
By [signature]
Attorney

Inventor
Adrianus Korpel
By [signature]
Attorney

Inventor
Adrianus Korpel
By John C. Pederson
Attorney

FREQUENCY DOMAIN IMAGE PROCESSING APPARATUS

The present invention pertains to image processing apparatus. More particularly, it relates to frequency-domain image-information systems that utilize mechanical resonators for defining image element positions.

As disclosed directly, and indirectly by means of an extensive bibliography, in an article entitled "The Interchange of Time and Frequency in Television Displays," by Korpel et al., PROCEEDINGS OF THE IEEE, Volume 57, No. 2, Feb. 1969, pp. 160—170, frequency domain display has long been known. By "-frequency domain" it is meant that different image element positions in a picture are represented in an electrical signal by differences in frequency. The amplitude or brightness at each image element is represented by the amplitude of the signal at the frequency corresponding to that position. This contrasts with the approach utilized in present-day television, for example, wherein image element position is defined by time. In the latter approach, the energy for determining the brightness at each image element position, absent complicated addressing schemes, must be delivered to each element during the brief time interval it is being addressed by a scanning mechanism. On the other hand, the frequency-domain technique readily permits the addressing of an entire line or row of image elements simultaneously, so that each image element may receive energy during the time interval allotted for the recording or display of an entire row.

As revealed in the aforesaid Korpel et al article, it was suggested long ago to employ mechanical resonators in an attempt to achieve a frequency-domain type of image display. Resonant-element approaches also have been heretofore suggested in connection with apparatus for analyzing the frequency spectrum of signal energy. Any such approach by means of which an image ultimately is to be visually displayed requires at least a plurality of resonators cooperating with some mechanism that will define an image in terms either of storage or display. However, such prior approaches suffer from one or more of the deficiencies of inadequate image-element resolution, complexity of basic design or lack of appropriate speed of response.

It is, accordingly, a general object of the present invention to provide new and improved image processing apparatus which avoids one or more of the aforenoted deficiencies of prior frequency-domain apparatus.

It is another object of the present invention to provide such apparatus which advantageously enables the use of fundamentally-simple resonator elements.

Still another object of the present invention is to provide new and improved image-processing-apparatus combinations readily adaptable to the utilization of better elements as they may become available.

Image processing apparatus in accordance with the present invention includes a bank of frequency-responsive mechanical resonators individually responsive to signal energy of respective different frequencies and individually disposed at respective different positions. Also included are image defining means having a plurality of different image element locations in respective correspondence with the resonator positions and in individually interacting relation with the resonators. Finally, the apparatus includes means for actively correlating the response of each of the resonators with image element intensity at the respective image element locations.

The features of the present invention which are believed to be novel are set forth with particularity in the appended claims. The invention, together with further objects and advantages thereof, may best be understood by reference to the following description taken in connection with the accompanying drawings, in the several figures of which like reference numerals identify like elements, and in which:

Figures 1, 2, 3, 3A:
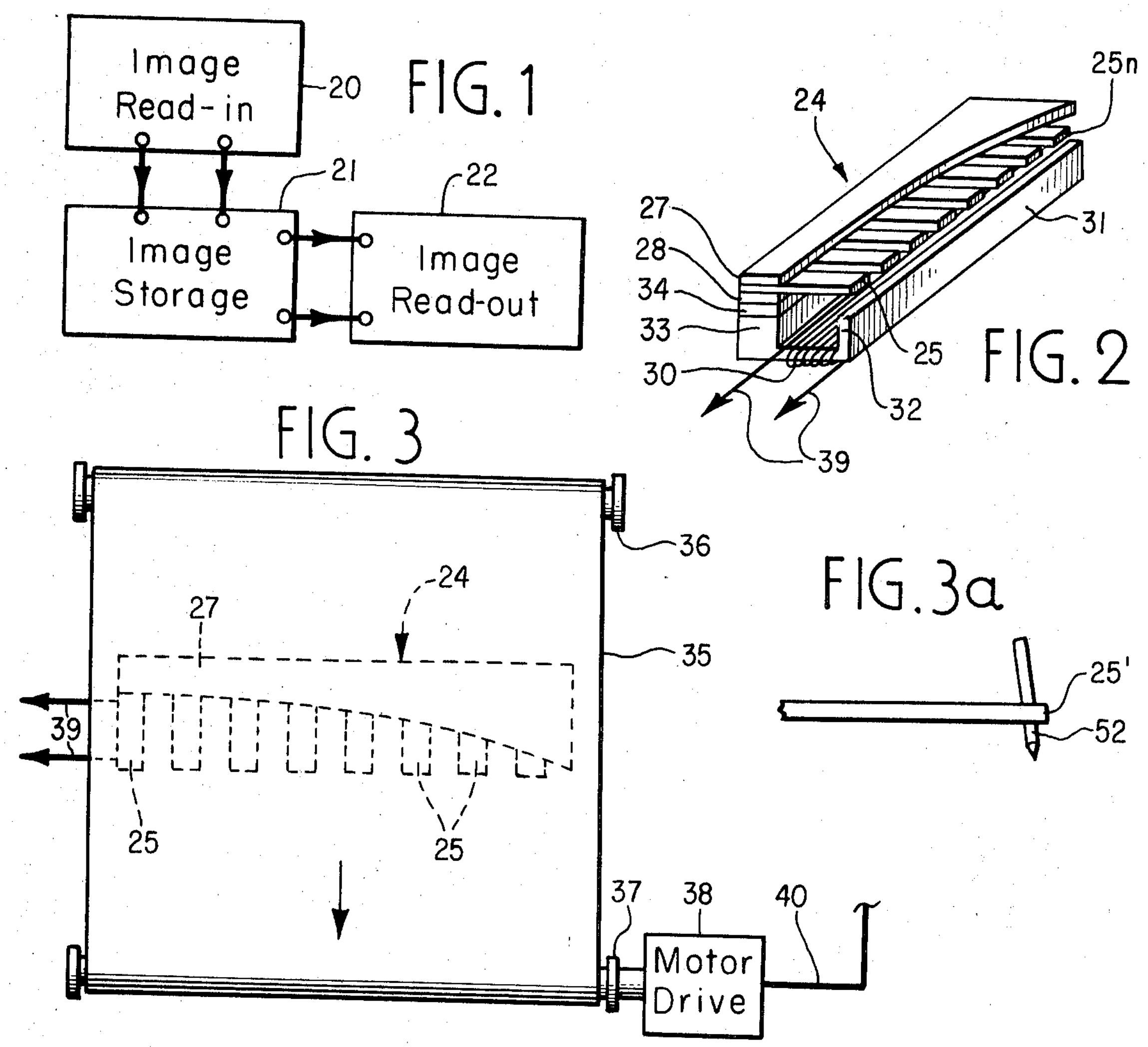
FIG. 1 is a block diagram illustrating the basic relationship between the storage of an image and its subsequent retrieval.
FIG. 2 is a perspective view of a bank of frequency-responsive mechanical resonators useful in connection with the apparatus of others of the figures.
FIG. 3 is a partly schematic plan view of one embodiment of an image processing apparatus which alternatively may be utilized for reproducing or storing image information.
Figure 4:
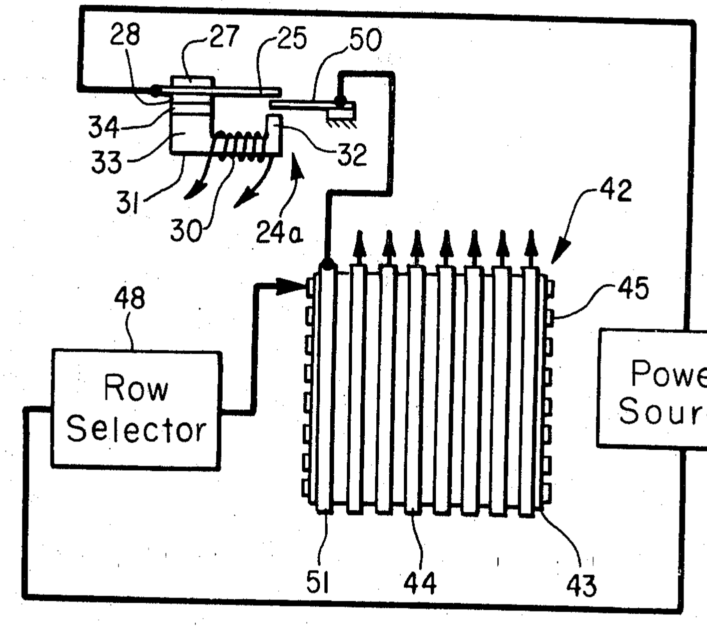
Figure 5:
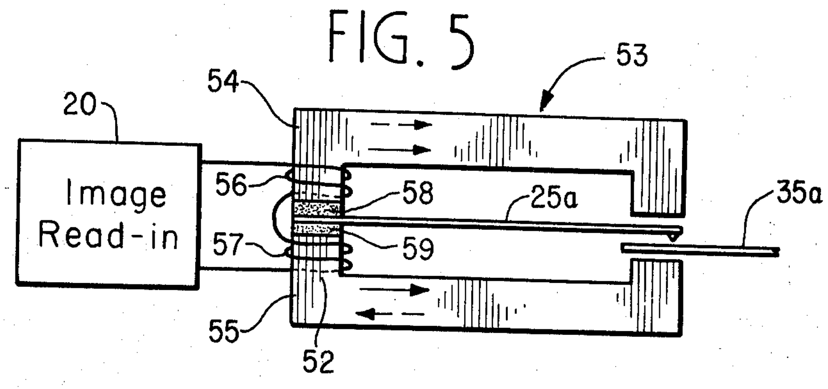
Figure 6:
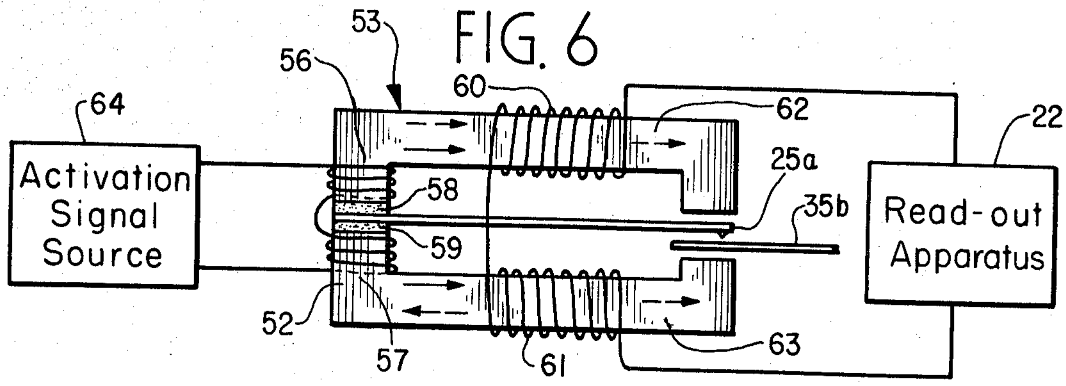
Figure 7:
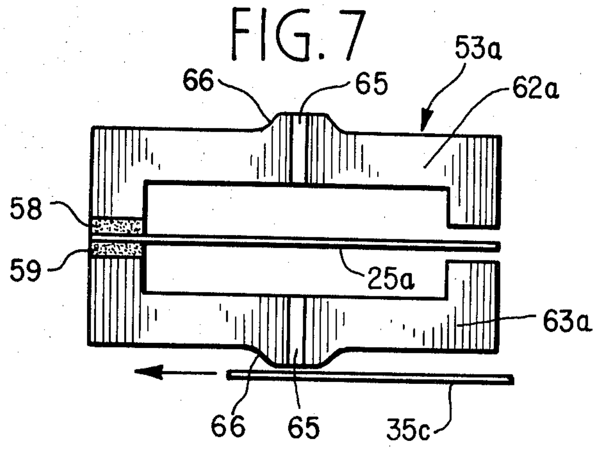
Figure 8:
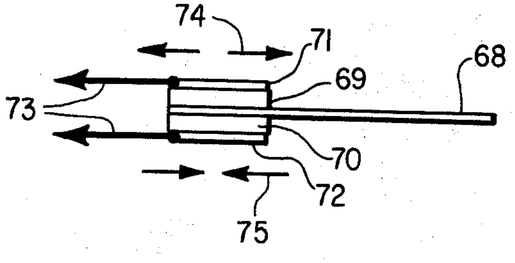
Figure 10:
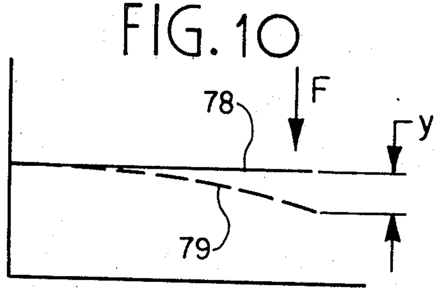
Figure 9:
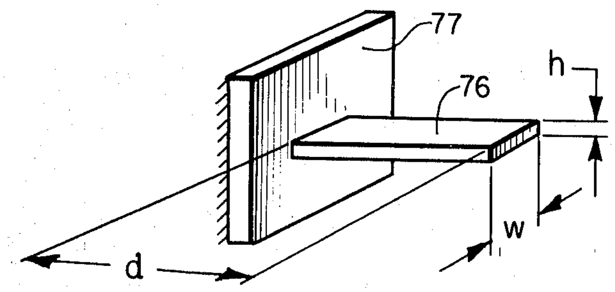
Figure 12:
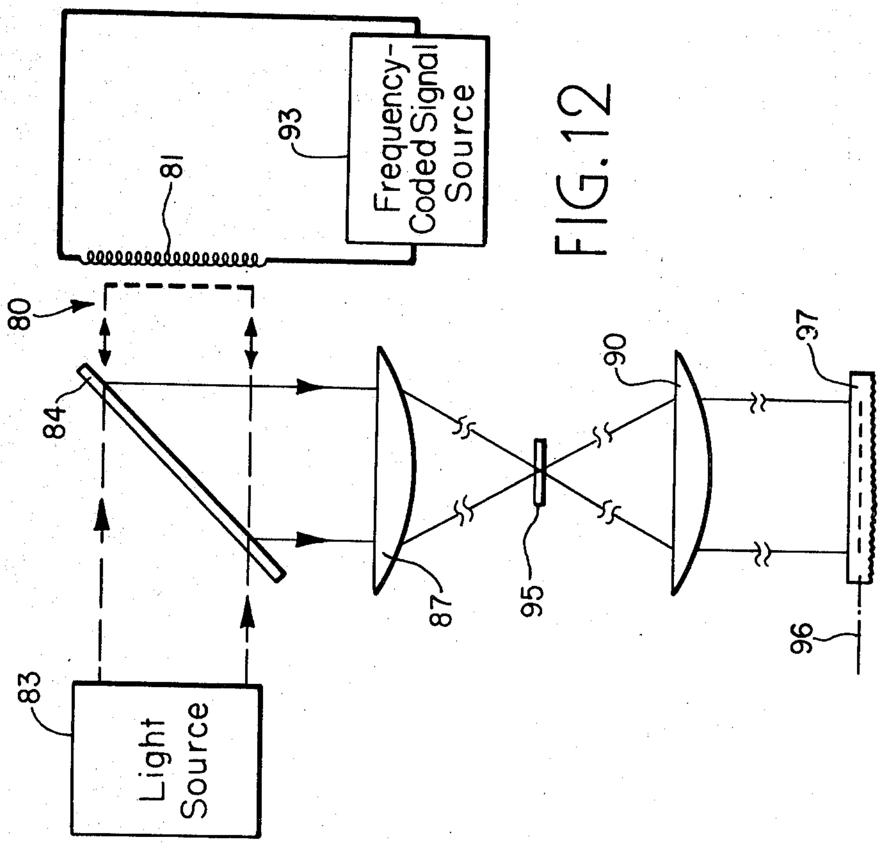
Figure 11:
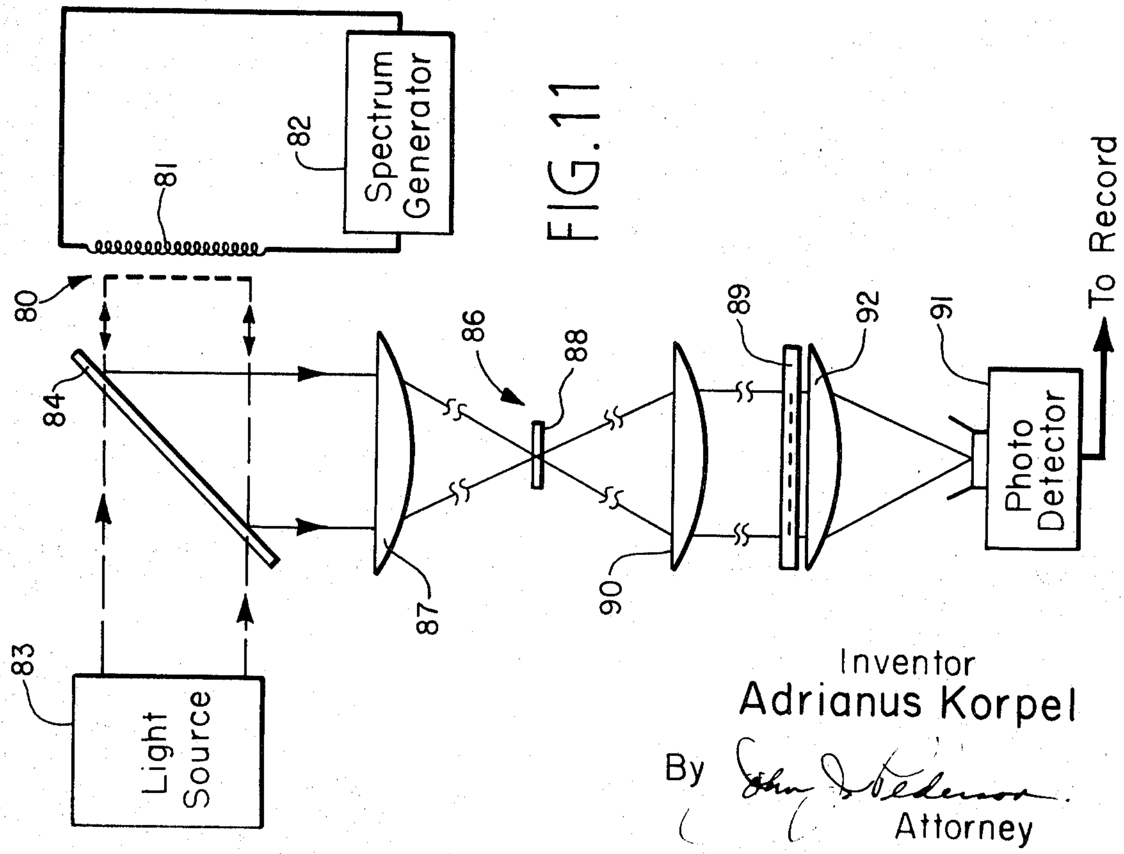
Figure 13:
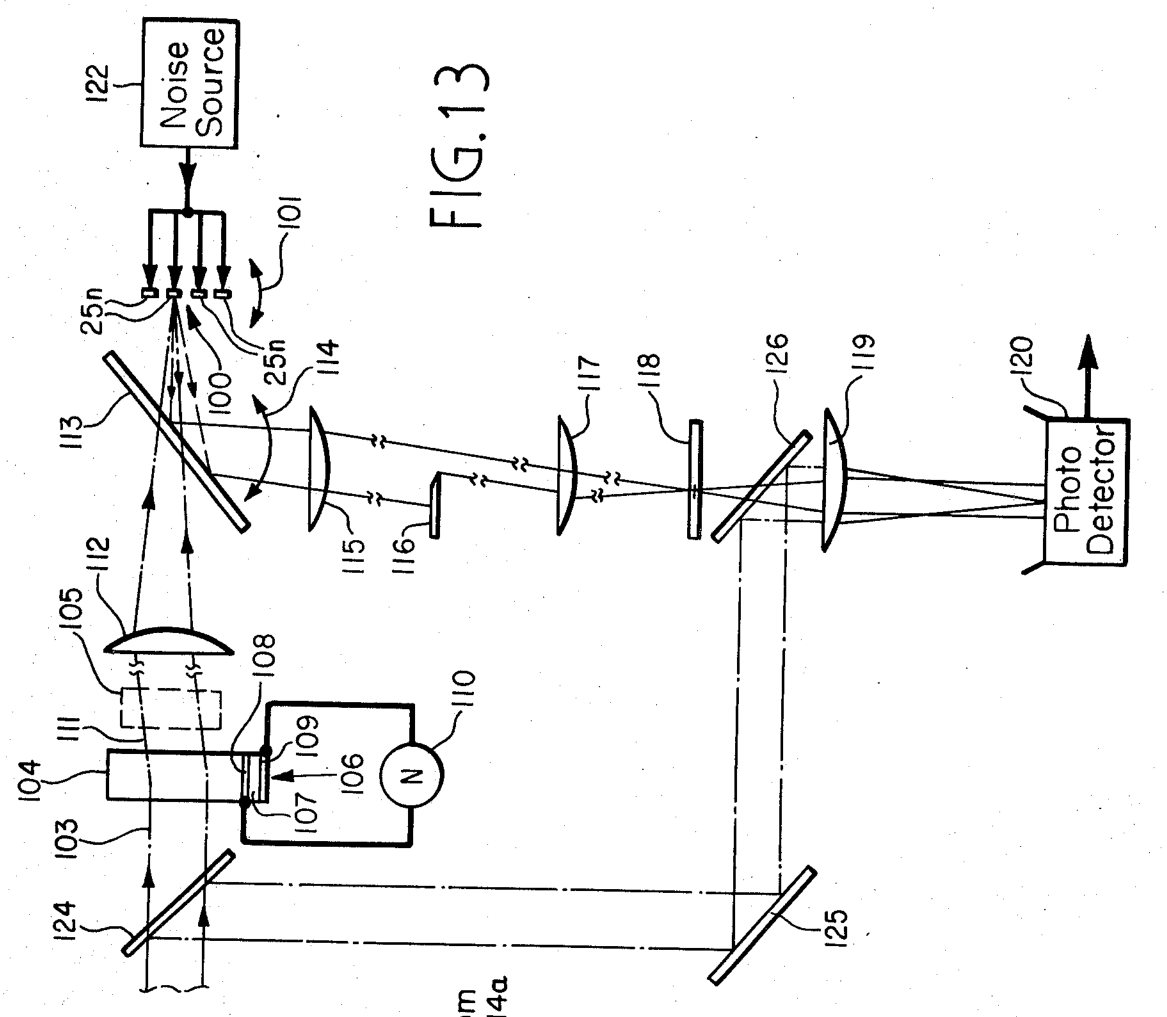
Figures 14A, 14B:
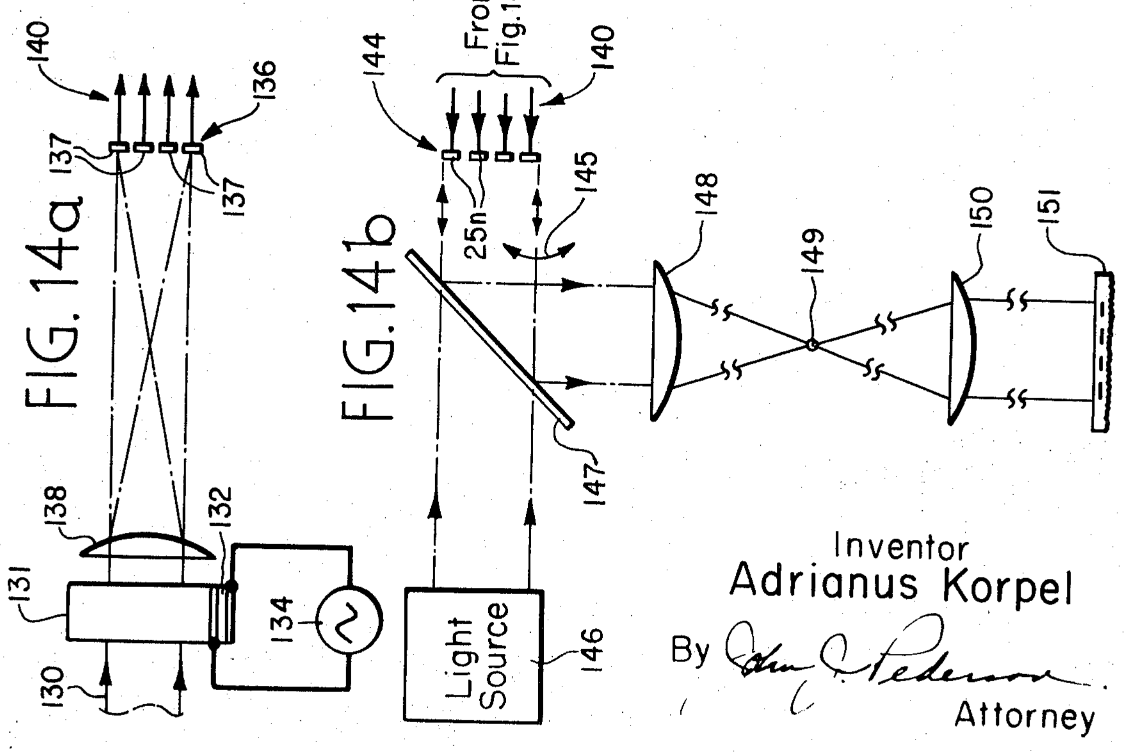

FIG. 3*a* is a side-elevational view of a portion of an alternative to one of the elements in FIG. 3;

FIG. 4 is a diagrammatic view of another embodiment of image processing apparatus;

FIG. 5 is a diagram of a further embodiment of image processing apparatus;

FIG. 6 is a diagram of a modification of the embodiment of FIG. 5;

FIG. 7 is a side-elevational view of an alternative to a portion of the structure in FIGS. 5 and 6;

FIG. 8 is a side-elevational view, including schematic indications, of an individual resonator element alternative to those depicted as a part of the apparatus of FIG. 2;

FIG. 9 is a perspective view of a fundamental reed-type mechanical resonator;

FIG. 10 is a plot illustrative of action exhibited by the resonator of FIG. 9;

FIG. 11 is a diagram of a further embodiment of image processing apparatus;

FIG. 12 is a diagram of still another image processing apparatus embodiment;

FIG. 13 is a diagram of a still further embodiment of an image processing system; and FIGS. 14*a* and 14*b* together constitute a diagram of yet another embodiment of apparatus for processing images.

As illustrated in FIG. 1, an image processing system may take the form of a combination of an image read-in device 20, an image-storage mechanism 21 and an image read-out apparatus 22. In connection with television, for example, read-in device 20 might conventionally be a vidicon or other type pick-up tube that views an image and develops a corresponding electrical signal. Storage mechanism 21 then might constitute a magnetic tape upon which the image-representative signal is recorded. Subsequently, the image might be reproduced upon a cathode-ray tube monitor in response to the signals that had been stored upon the tape, read-out apparatus 22 thus corresponding to such a monitor. The apparatus to be described herein in several different forms may be utilized for the purpose of performing one or the other, as the case may be, of the functions of device 20, mechanism 21 or apparatus 22.

Because signals of different frequencies may be easily recorded on and retrieved from even on an ordinary phonograph record, attention herein is specifically directed to the storage of image-representative signals at low frequencies. To this end, use is made of the frequency-domain mode of image signal formation mentioned above in the introduction. Accordingly, it is assumed for a beginning that mechanism 21 stores low-frequency signals with their several different frequencies corresponding to different positions along a row of image elements to be reproduced. The amplitude of each specific signal, in turn, is proportional to the intensity or brightness of the image element the position of which is defined by the frequency of the signal. In a practical facsimile system capable of reproducing line drawings, such as cartoons, with reasonable resolution, there might be one hundred image elements in a row. By assigning a band of 50 hertz for each image element, a frequency range of from 5,000 to 10,000 hertz is all that would be required. That range is well within the capability of conventional phonograph recorder techniques. While, of course, the range could be increased by use of known schemes of redundancy reduction, or which involve an interchange as between frequency content and dynamic range, a discussion in detail of those and other modifications that might be employed is not necessary to an understanding of the basic approaches to be presented in this application.

FIGS. 2 and 3 depict a first form of imaging apparatus that may be utilized to play back and reproduce an image from a frequency-domain signal of the kind just exemplified. For simplicity of illustration, however, the apparatus of FIGS. 2 and 3 assumes a row of just eight image elements. To this end, the apparatus includes a bank 24 of frequency-responsive mechanical resonators 25 each of which takes the form of a resonant reed. Resonators 25 are individually responsive to signal energy of respective different frequencies for exhibiting physical movement of flexure of their free ends, their other ends being clamped between supporting strips 27 and 28. Consistent with the fact that the frequency of resonance of each reed is primarily a function of its unclamped or free length, the widths of strips 27 and 28 are tapered so that the unclamped lengths of the reeds differ from one end of the bank to the other. Preferably, the locus of the clamped points is such that the resonant frequency increases linearly across the bank. The shortest, and thus in this case the highest-frequency, reed in the bank is designated 25n for the purpose of reference subsequently in connection with FIG. 13. It may be noted that a similar tapered-width clamping arrangement heretofore has been employed in reed-type music boxes. In general, the dissipative nature of strips 27 and 28 is selected in accordance with their inherent damping effect upon the reeds in order to obtain the response time desired for any given application.

FOr selectively energizing the different reeds in bank 24, frequency domain signals are fed from storage mechanism 21 to a coil 30 wound around the bight of a U-shaped section 31 of magnetic material. One leg 32 of section 31 is disposed beneath the free ends of reeds 25, while the other leg 33 is aligned beneath clamping strip 28. A strip 34 of permanently magnetized material is clamped between leg 33 and strip 28 to introduce a magnetic bias into the system; alternatively, an additional coil conductive of direct current could be used for this purpose. In any event, section 31 together with strips 28 and 34 complete respective magnetic circuits for the individual reeds 25. Upon the receipt of an electrical signal in coil 30 having a frequency the same as the resonant frequency of a particular one of the reeds, the reed responds by exhibiting flexural-mode vibration as a result of which its free end vibrates up and down. It may also be noted at this point that, in a converse mode of operation, flux may be induced into the different reeds from an external magnetic source whereupon the presence of a flux variation at a frequency corresponding to that of a given reed will effect the generation of electrical signals in coil 30 at that frequency. That is, the mechanism of FIG. 2 may be operated in either a motor or a generator mode. Alternatively with respect to the first-described motor mode, vibration of any reed 25 may be induced, in the absence of magnetic bias, by the application of a signal of one-half the resonant frequency.

Turning to FIG. 3, an image-representing medium 35 is disposed adjacent to resonant reed bank 24 so that individual different portions of medium 35 are disposed in the path of movement of respective reeds 25. In this case, medium 35 is in sheet form being drawn from a roll upon a supply reel 36 by a take-up reel 37 caused to rotate by a motor drive unit 38. With movement of medium 35, the portions of the medium over the respective reeds thus define a series of elongated tracks.

In what may be thought of as a facsimile version, medium 35 is a pressure-sensitive paper of the kind which produces a visible indication in response to a physical impression thereon. Correspondingly, the paper is so disposed as to be physically contacted by reeds 25 upon their resonant vibration in response to electrical signals supplied to coil 30 by way of leads 39. Preferably, a platen of non-magnetic material (not shown) is disposed to lie immediately above the pressure-sensitive paper so as to constitute the writing surface for the moving reeds.

Assuming that pressure-sensitive paper 35 is stationary for a moment, it will be observed that the paper constitutes a means in which an image is defined by a plurality of different image element locations that are distributed in correspondence with different image element positions in turn defined by the array of resonant reeds. Moreover, the structure that serves to dispose the pressure sensitive paper directly in the path of movement of the reeds upon their vibration serves actively to correlate that physical movement and the image element intensity at the respective image element locations. That is, a trace or mark is made upon paper 35 at the image element location corresponding to a reed which is energized as a result of an electrical signal in coil 30, while no trace or mark is made by a reed which is not energized or caused to vibrate. The resulting image line which is thereby traced or marked upon the surface of paper 35 is, therefore, a reproduction of the image line that is represented by the electrical signals in coil 30.

Motor drive unit 38 is energized to advance the paper continuously at a rate appropriate to present a fresh region of the paper over the free ends of reeds 25 as information corresponding to each different line of image elements is successively received. Consequently, the successive supply of different groups of signals to coil 30 causes the activated ones of the reeds in response to the signals to make new sets of marks across the width of the paper. Thus, a plurality of lines of image elements may be reproduced. As will be apparent, motor drive unit 38 may be connected by a lead 40 to mechanism 21 (FIG. 1) so as to be controlled in response to synchronizing signals also recorded or stored along with the image-representative signals. That is, a synchronizing signal may be included at the end of the time period allotted to each line of image-representative signals so as to control the advance of paper 35. However, synchronizing signals are not necessary. One of the advantages of a frequency domain system is that it will work without synchronizing signals. That is, the vertical scale of the drawing may change a bit because of variations in motor speed, but a line cannot start halfway or be entirely missing.

For the more sophisticated example given above in which the apparatus in FIG. 3 would include 100 banks of 100 resonators each with each reed having been assigned a bandwidth of approximately 50 hertz, it takes in practice about 2 seconds for the system to respond and trace out a complete image or picture. Consequently, the apparatus may be utilized, for example, to depict illustrations visually in correspondence with a running audio commentary that also may be stored or recorded along with the image-representative signal and converted to sound by an associated audio reproduction system. As so far described, then, the basic function of the apparatus is of that of a facsimile reproducer. A particular feature is that it enables the visual reproduction of an image represented by recorded, comparatively low-frequency, audio signals occupying a total frequency range consistent with the usual audio recording media such as gramophone records or magnetic tapes. As a possible alternative mode of operation, signals derived directly from a frequency-domain image read-in device 20 of FIG. 1 may be fed to coil 30 as a result of which the image represented by those signals is visually recorded by the apparatus of FIG. 3. Subsequent read-out then may be accomplished by the use of optical scanning apparatus.

Instead of writing or storing image elements directly, the vibratory response of reeds 25 may be employed to selectively activate an associated but separate image-display panel. To this end, the system of FIG. 4 includes an image-representing panel 42, in this case composed of a sheet of electroluminescent material 43 sandwiched between a plurality of elongated, spaced conductive elements 44 and a similar plurality of spaced, elongated conductors 45 arranged orthogonally to elements 44. Panel 42 thus constitutes a matrix of rows 45 and columns 44 of image-defining elements. Upon the application of a suitable energizing potential across any given row and column, the electroluminescent material at the row-and-column intersection is caused to emit light. As is known in the art, a diode or other non-linear element is preferably included at each intersection in series with the electroluminescent material in order to prevent crosstalk.

In addition to a power source 47 and a row selector 48, the system of FIG. 4 includes a switching arrangement responsive to the movement of the individual resonators for completing energization of respective columns 44. This switching arrangement 24a is generally similar to that of resonant reed bank 24 of FIG. 2. In this case, however, the vibratory free end of each of reeds 25 is positioned adjacent to a switch contact 50 situated so as to make repeated electrical contact with the corresponding reed upon vibratory motion of the latter. Thus, the first reed 25 is connectable to switch contact 50 to complete a conductive path from one side of power source 47 to a first column electrode 51. The other reeds are similarly connected to the other column electrodes, while the other side of power source 47 is connected selectively to the individual row electrodes by means of selector 48.

In operation, a given row electrode is chosen by selector 48 and the electric signal energy corresponding to the image elements of the selected row is fed to coil 30. Vibratory actuations of reeds 25 in response to the electrical signals complete energization of the corresponding different columns of the panel so that light is produced from the appropriate image element locations. When row selector 48 is subsequently switched to the next row electrode, the next group of signals representing image elements of the second row are fed to coil 30. In this manner, a complete image frame ultimately is displayed in response to signals of an audio-frequency nature. Of course, other forms of matrix-type display panels are now well known and may be employed in place of the illustrated electroluminescent panel. Alternatively, a matrix-type image storage device may be employed in place of the electroluminescent panel to hold the received information instead of producing a display.

The apparatus of FIG. 3 may be modified to employ ordinary non-pressure-sensitive paper as medium 35. In one alternative, each of resonant reeds 25' is equipped with a conventional ink pen 52 (FIG. 3*a*). The respective positions of the different reeds 25 again establish a plurality of tracks extending lengthwise of the recording medium. Using a conventional ink, image elements are traced at each location corresponding to the presence of a received signal of the frequency assigned to that location. For magnetic storage, the ink may exhibit a permeability different than that of air so that a magnetic pick-up subsequently may be used for retrieval. In either case, the density of the ink laid down in each track may be proportional to the amplitude of vibration of each of the respective resonant reeds. However, proportional response is not necessary for line drawings. Of course, should a given reed be completely inactive by reason of the absence of a signal energizing it in either the print-out or the storing mode, that track would be discontinuous.

Similar apparatus may be utilized in a play-back mode to read out magnetically stored information. That is, variations in permeability stored in tracks 53 may be used to induce flux changes in the reeds so that, by generator action, corresponding signals are induced in coil 30. From a practical standpoint however, a balanced magnetic structure is preferred for either recording or play back. Referring, then to FIG. 5, a resonant reed 25*a* is clamped between the mid-section of the bight 52 of a U-shaped magnetic yoke 53, on the two sides 54 and 55 of which are wound respective series-connected coils 56 and 57 connected across read-in device 20. To introduce a magnetic bias, a pair of oppositely polarized permanent magnets 58 and 59 are inserted in the bight portion on opposite sides of the reed. The DC and AC flux directions are as indicated by the solid-line and broken-line arrows, respectively. Medium **35*a*, upon which the variable-permeability tracks are to be deposited, is disposed within the gap of yoke 53 immediately to one side of reed 25*a* which carries a pen as in FIG. 3*a***.

In operation, the composite frequency-coded signal is applied to all of the resonant reeds as before. Vibration is induced in each of those reeds for which a signal of the corresponding resonant frequency is present. Once more, the respective positions of the different reeds establish a plurality of tracks extending lengthwise of the recording medium, and the density of the ink laid down in each track may be proportional to the amplitude of vibration of the associated reed.

For read-out, a similar magnetic structure may be employed as shown in FIG. 6. In this case, however, additional series-connected coils 60 and 61 are wound respectively on legs 62 and 63 of yoke 53, to respond to any unbalanced components of the AC flux in the directions indicated by broken-line arrows to the right of the coils. Read-out apparatus 22, which may be a display device such as that of FIG. 3 or panel 42 of FIG. 4, is coupled across the series-connected coils 60 and 61. On the other hand, coils 56 and 57 in this case are coupled across a source 64 of activation signals. The complete assembly again includes a bank of the resonant reeds, and source 64 delivers either a plurality of pulses or a spectrum of noise that includes the respective resonant frequencies of the reeds.

In operation, the magnetic balance in the structure together with the balanced arrangement of coils 60 and 61 results in the absence of any signal being fed to apparatus 22 unless that balance is perturbed by a permeability change within the air gap adjacent to the free end of one or more of the reeds. Thus, when a track of different permeability material on medium **35*b* is aligned with reed 25*a* in FIG. 6, the difference in permeability presented by the track results in an output signal being fed from coils 60 and 61 to apparatus 22 at the resonant frequency of reed 25*a***. Correspondingly, the changed permeability in other tracks adjacent to others of the reeds in the complete assembly results in the development of a plurality of signals each of a unique frequency representing a particular image element location.

In an alternative modification, apparatus 22 is instead coupled across coils 56 and 57, and each different reed in the bank is associated with its own magnetic circuit and set of coils 60 and 61. Source 64 then takes the form of an individual signal being fed to the coils 60 and 61 associated with each different reed at its respective frequency. A read-out signal is developed in coils 56 and 57 upon the introduction, as before, of a material of different permeability within the air gap adjacent to the free end of the reed.

Because of the typically small reed lengths at the frequencies contemplated, the structure of FIGS. 5 and 6 cannot accommodate a sufficient length of medium **35*a* or 35*b* to carry a long message. That limitation may be overcome by employing yoke 53*a* of FIG. 7. In this case, legs 62*a* and 63*a* each include an insert 65 of non-magnetic material (e.g., brass) so as to form gaps in the magnetic circuit. At the same time, the portions 66 of the legs abutting inserts 65 are enlarged outwardly so as to form more efficient flux paths capable of being perturbed by permeability variations in a magnetic ink track on medium 35*c*. While only the lower portion 66** and its gap are herein utilized, the upper one is included to preserve symmetry of the structure. The end result is that the reed responses, though the reeds are physically displaced from the perturbations, are effected by them in essentially the same way.

The different apparatus as so far described contemplates magnetic action or reaction of a resonant reed. FIG. 8 illustrates an alternative that may be employed in any of the different embodiments. In this instance, a resonant reed 68 has its stationary end clamped between opposite layers 69 and 70 of a piezoelectric material. Electrodes 71 and 72, between which layers 69 and 70 are sandwiched, are connected by leads 73 to a source of electric potential. Piezoelectric layers 69 and 70 are poled conversely so that, in response to an electric potential, layer 69 expands in the horizontal direction while layer 70 contracts as indicated respectively by arrows 74 and 75. The resulting mechanical excitation is sufficient to induce resonant vibration of reed 68. Reciprocally, induced vibration of reed 68 from an external source excites layers 69 and 70 so as to develop an electrical signal across leads 73.

Whether the coaction is of a magnetic or piezoelectric nature, it may be instructive to consider certain basic parameters of the resonant reeds themselves. As shown in FIG. 9, a resonant reed 76 cantilevered from a rigid support 77, has a length $d$, a width $w$ and a height $h$. FIG. 10 is a related plot wherein solid line 78 represents the neutral or unactivated position of reed 76, while dashed line 79 depicts the maximum extent of flexural motion of the reed. Thus, in response to a force F, the free end of reed 76 is deflected by an amount $y$. It can be shown that $y=C_mF$ and that $C_m=d^3/3EI$, where $E$ is Young's modulus and $I$ is the geometrical moment of inertia about the neutral position. Further, $I=(1/12)wh^3$. Accordingly, $C_m=(4/Ew)\ (d/h)^3$. For a distance of $y$ of 1 millimeter and a steel reed of a width $w$ also of 1 millimeter, a ratio $h/d$ of 1/10 requires a force of $5\times10^6$ dynes. On the other hand, a ratio $h/d$ of 1/100 reduces the force requirement to $5\times10^3$ dynes. Assuming that the mechanical Q of the vibrating reed to be 100, the actual force required is 1/100th of the calculated force. The frequency of resonance $f_4$ is expressed by the relationship $$f_r = (1.875)^2\, cR/(2\pi d^2),$$

where $c$ is the sound velocity and $R$ is the radius of gyration, which equals $h/2\ \sqrt{3}$. Using steel, a frequency of 10,000 hertz and a height $h$ of ¼ millimeter, the length $d$ must be 1.8 centimeters so that the length to height ratio is 72. It may be shown that, with this set of values, the frequencies assigned to the neighboring reeds do not cause interfering overtones over the required octave range from 5 kHz to 10 kHz.

Similar resonator banks may also be employed in conjunction with optical systems utilizing light for the purpose of processing images. FIG. 11 illustrates a system the purpose of which is to develop electrical signals that constitute a time-domain representation of an image carried by a transparency or the like. Included in the system is a bank 80 of individual resonators which may be a succession of frequency-responsive reeds such as those depicted in FIG. 2. The bank of reeds are magnetically energized in common from a coil 81 driven by a spectrum generator 82 which produces signals over a range of frequencies assigned respectively to the different resonators in bank 80. Thus, all of the resonators are simultaneously caused to vibrate.

Illuminating resonators 80 is a collimated sheet beam of light from a source 83, the beam of light in this case traversing a partially-reflective mirror 84 in its travel to resonator bank 80. In FIG. 11, the sheet beam is thin in the direction normal to the plane of the drawing. A portion of the light is reflected backwardly from each resonator with each such portion being periodically angularly deflected in response to the resonator movement. As viewed in FIG. 11, the free end of each of the individual resonators in bank 80 is viewed and the clamped ends of the resonators are beneath the plane of the drawing. Consequently, the portion of the light beam reflected from each resonator is caused by the flexural movement of the latter to be periodically deflected above and below the plane of the drawing with a periodicity determined by the resonant frequency of the resonator.

Upon returning to partial mirror 84, a portion of the deflected light is directed downwardly into a spatial filtering and imaging system 86. More particularly, the reflected light from mirror 84 is focused by a convergent lens 87 onto a knife edge 88 from which the emerging light impinges upon a transparency 89 by way of another convergent lens 90. In FIG. 11, only the upper surface or edge of knife edge 88 is visible, the remainder of that element being below the plane of the paper. Its edge surface is disposed at a position in the focal plane of lens 87 when the resonators in bank 80 are in a neutral or stationary position about which the resonators periodically flex when excited. While other imaging systems may be employed in this and subsequent figures, a feature of the system is that it serves to image the reed bank upon an image plane in which transparency 89 is located. As shown, lenses 87 and 90 constitute a one-to-one telescope with a focal length F between each lens and knife edge 88. The distance from reed bank 80 to lens 87 by way of mirror 84 is F, and the distance transparency 89 and lens 90 also is the focal length F. Thus, the imaging system serves to correlate the physical movement of the resonators with the different image element locations in transparency 89. Knife edge 88 causes the light to emerge from it in pulses the repetition rate of which, at any position along the width of transparency 89, corresponds to the frequency of excitation of the correspondingly positioned one of the resonators in bank 80.

Transparency 89 carries an image represented by variations in opacity across its width. Consequently, the light transmission in each elemental light path is altered in accordance with the image brightness of the corresponding image element. After passage through transparency 89, the different light quantities are focused upon a photo-sensitive element or photo-detector 91 by a convergent lens 92. Photo-detector 91 responds to the light as modulated by the transparency to develop an electrical signal wherein different frequencies represent respective image element locations and wherein the amplitude of each single-frequency signal component represents the image element brightness at the corresponding image element position in the transparency. The electrical signal output from photo-detector 91 is then fed to a recording device such as image-storage mechanism 21 of FIG. 1. The output from photo-detector 90 is a comparatively low-frequency electrical signal coded as to image element positions by use of the frequency-domain mode.

As thus far described, the apparatus of FIG. 11 permits the development of an electrical signal representative of a single line or row of image elements contained in transparency 89. For the purpose of developing signals representative of successive lines within the image, it is only necessary to displace transparency 89 in a direction into or out of the plane of the drawing at a rate appropriate to the time necessary to process one line and analogous to the movement of medium 35 in FIG. 3 as successive image lines are displayed or stored. Specifically, the transparency is moved at a speed $v=d'/T_c$, where $d'$ is the height (vertical resolution) of an image element and $T_c$ is the reciprocal of the bandwidth of the reeds in bank 80. The degree of collimation required of the beam from light source 83 depends on the magnitude of movement of the resonators in bank 80. Preferably, a well-collimated laser beam is utilized.

The generally similar apparatus in FIG. 12 may be employed for reproducing the electrical signal developed by photodetector 91 in FIG. 11. Accordingly, the sheet beam of light from source 83 again is directed upon resonator bank 80 through partial mirror 84 with the resonator bank being excited by coil 81. In this case, however, resonator bank 80 is driven by signals from a frequency-coded signal source 93 in which the signals developed at the output of photo-detector 91 in FIG. 11 have been stored. Those of resonators 80 which are excited by the signals from source 93 reflect the associated portions of the light beam from source 83 backwardly toward partial mirror 84 with each such portion being repetitively deflected above and below the plane of the drawing. The reflected light is directed downwardly by mirror 84 and focused by convergent lens 87 upon a focal plane in which is located a spatial filtering element; in this case the spatial filtering element is in the form of a thin ribbon 95 that serves as a zero-order stop. That is, ribbon 95 serves to block the light reflected from any one of the resonators in bank 80 that remains unexcited, while light from any one of the resonators that is excited is caused to pass periodically above and below the stop. Lens 87 serves together with lens 90 to image the resonators of bank 80 upon an image plane 96 in which, in this case, is located a sheet 97 of ground glass. The different spacings of the optical elements are related to the focal lengths in the same manner as in FIG. 11, with ground glass 97 of FIG. 12 being in the position of transparency 89 of FIG. 11.

In operation, an image is reproduced by ground glass 97 in which the intensity of the light at each image element location corresponds to the extent to which light is deflected by a different one of the resonators in bank 80. Instead of ground glass, a strip of photographic film may be disposed in image plane 96 as a result of which the image is recorded on the film. Movement of the film vertically of the plane of the drawing, as in the case of the transparency in FIG. 11, enables the recording recording of successive lines of image information as correspondingly different groups of image-representative signals are delivered to coil 81 from source 93.

In an alternative mode of operation of the system of FIG. 12, an uncoded signal from source 93 is used to record the frequency/power spectrum of that signal upon a film disposed in image plane 96. Subsequently, the signal as thus photographically recorded may then be read out by using the film as transparency 89 in the system of FIG. 11. The redeveloped signal has the same power spectrum as that of the signal from source 93. However, phase information is not, in this case, preserved.

It will be seen that the systems of FIGS. 11 and 12 permit the recording of a video image on film in the form of audio-frequency information. For the case in which there are 100 resonators in a line or row covering a frequency range of 5 to 10,000 hertz, the addressing time for each resonator is approximately only 1/50th of a second. Assuming an allocation of 0.01 millimeters on the film or photographic record for each line, the required film speed is only about 0.5 millimeters per second. Further improvement may be made by utilizing known de-magnification techniques so that the film itself need not be wider than about 1 millimeter.

The system of FIG. 12 when incorporating a sheet of ground glass for direct display purposes may accommodate successive lines of information by including a vertical scanning device between stop 95 and image plane 96. In one alternative useful at slow scanning speeds, a photo-electric, electroluminescent or a photochromic read-out device may instead be disposed in the location of image plane 96. As a further alternative, a line of photosensitive diodes or similar devices may be disposed in image plane 96 to develop an electrical signal which then is read out serially in what becomes a conversion to time-sequential coding. As a still further modification, such a series of photo-detecting elements may be directly connected to a matrix-type display panel.

In any event, the systems discussed to this point are generally suitable for comparatively slow-speed image processing. Rather severe limitations are encountered in any attempt to employ the preceding embodiments for the purposes of producing, for example, a standard television signal in which each line represents a time duration of 64 microseconds and in which an entire frame of lines occurs in 1/30th of a second. Thus far, it has been contemplated to display or record each line sequentially. If, instead, an entire frame of lines are displayed simultaneously, substantial savings in bandwidth of the electrical signal may be obtained as a result of which its basic audio-frequency nature may be preserved. To this end, the image-representative information of each line may be coded on a different subcarrier. Proceeding from this approach, the apparatus of FIGS. 11 and 12 may then include a matrix of rows and columns of the resonators with each line of resonators having the same range of frequency-excitation spread. With such an array of resonators, it is unnecessary to effect vertical movement of transparency 89 in FIG. 11, the entire frame or picture being displayed simultaneously; similarly, an entire frame could be displayed at the same time on the ground glass sheet 97 of FIG. 12. For a 500-line picture, however, there would need to be 500 different demodulators to separate out the different line information from the respective different subcarriers. The system of FIG. 13 avoids this undesirable complexity.

Represented in FIG. 13 is a more direct approach to the development of a frequency-domain electrical signal which simultaneously represents an entire image frame composed of a succession of lines of picture elements. To this end, the apparatus includes a plurality of banks of resonators arranged in a row and column array 100. Each row is composed of a bank of resonators as in FIG. 2 with its individual reeds distributed in a direction normal to the plane of the drawing of FIG. 13. Thus, for each bank only the one end-most reed **25*n* is shown in FIG. 13, and the associated magnetic structure is omitted for clarity. The banks are oriented so that the free ends of the reeds, when activated, move back and forth in the direction indicated by arrow 101**. Each column is defined by the aligned reeds of the different banks that exhibit a common resonant frequency. The resonators in each row thus are individually responsive to signal energy of respective different frequencies, and the position of the resonators in each row correspond with the image element locations as before.

The overall arrangement is somewhat similar to that of the system of FIG. 11 except that in this case provision is made to illuminate each different row of the resonators in array 101. To that end, a beam 103 of monochromatic light is directed into a diffraction cell 104. Beam 103 is of sheet-like cross-section, being wide in the direction normal to the drawing plane so as to illuminate an entire bank or row of resonators simultaneously. If of insufficient width, a conventional cylindrical telescope, indicated by dashed outline 105, may be included following cell 104 so as to expand the beam width in the direction normal to the plane of the drawing. Cell 104 includes a medium, such as water, which is transmissive to the light and also propagative of acoustic waves developed by a transducer 106 comprising a piezoelectric element 107 sandwiched between a pair of electrodes 108 and 109 across which is connected a signal generator 110.

The detailed manner or operation of diffraction cell 104 is described in the aforementioned Korpel et al article as well as in several of the references cited therein. It is sufficient for present purposes to note that, by reason of signals from generator 110, the acoustic waves propagating upwardly in cell 104 may have components of different frequencies corresponding to the individual rows in array 100. That is, the action of cell 104 is to deflect the monochromatic light in beam 103 at an angle determined by the acoustic frequency. For some particular acoustic frequency, a band of light 111 emerges from cell 104 travelling in a direction toward array 100. Cooperating with cell 104 is a cylinder lens 112 so that the band of light is focused, through a partial mirror 113, upon a particular row of resonators in array 100.

Vibration of the free end of resonant reed **25*n* in the illuminated row deflects light, reflected backwardly from the reed, back and forth in the plane of the drawing. Upon reaching partial mirror 113, a portion of the reflected and deflected light is directed downwardly at which point the reflected light is deflected back and forth as indicated by arrow 114. The downwardly-directed light then passes through a spherical lens 115, over a knife edge 116 and through another spherical lens 117 to an image plane containing a transparency 118. The light from the other resonators in the same row under illumination traverses similar paths from array 100 to transparency 118**.

Lenses 112 and 115 constitute an optical system that images the plane in the center of sound cell 104 upon knife edge 116 which serves as a filtering means. Lenses 115 and 117, constituting a one-to-one telescope, also images the plane of the resonators in array 100 upon the image plane at transparency 118 which serves ultimately to define the image by altering the light transmission in each elemental light path in accordance with the image brightness of the corresponding image element. For these purposes, assigning the customary symbol F to represent the focal length from cylinder lens 112 to array 100, spherical lens 115 is located a distance F from the array by way of mirror 113. Knife edge 116 is also spaced a distance F from spherical lens 115 as is spherical lens 117 from the knife edge, assuming that lenses 115 and 117 are of the same focal length. Transparency 118 is spaced by the focal distance F from spherical lens 117, and the central plane of cell 104 is spaced the same distance F from cylinder lens 112. A final spherical lens 119 serves to direct the light emerging through transparency 118 upon a photo-detector 120 that responds to the light as spatially modulated by the transparency to develop an electrical signal wherein different frequencies represent different image element locations. The spacings between transparency 118, lens 119 and detector 120 may be arbitrarily selected so far as the remainder of the optical system is concerned.

Energizing all of the different resonators in array 100 is a source 122 of noise or at least which includes signals of each of the different frequencies necessary to excite all of the resonators simultaneously. As also explained in the Korpel et al article, the process of deflecting the light in beam 103 into band of light 111 results in such band of light having a uniquely different frequency. The band of light 111, upon being reflected and subjected to the rectifying action of knife edge 116, has been amplitude modulated throughout the different portions of its width corresponding to the different resonators in the illuminated row, with the vibratory frequencies of the different resonators. Thus, the light reflected from each resonator in the illuminated row not only traverses transparency 118 at a corresponding unique image element location but, by action of the varying opacity in the transparency, is further coded as to image brightness upon emerging from the transparency and being directed to photo-detector 120.

Thus far, the discussion has assumed the instantaneous existence of a single acoustic frequency in cell 104 corresponding to the development of only the one band of light 111. In one possible manner of operation, the acoustic wave frequency may be swept through a range so that different rows or bands of the resonators are successively illuminated. By reason of the change in light frequency effected by cell 104 as the deflection angle changes, the light ultimately arriving at detector 120 at any given instant will have a frequency that uniquely indicates from which row of resonators it has been reflected.

Going one step further, generator 110 preferably simultaneously develops signals of each frequency corresponding to the deflection angles necessary to illuminate all rows or banks of resonators. Thus, a plurality of acoustic waves co-exist in cell 104 and a corresponding plurality of light bands illuminate all resonators in array 100 at the same time. Consequently, the entire array is imaged at the same time on transparency 118. At detector 120, the carrier frequency of any arriving quantity of light identifies the row from which it came, the frequency of its amplitude modulation specifies the image element location in the selected row and its intensity represents the brightness of the selected image element. To achieve this result, source 110 may simply be a noise generator having a spectrum of signal frequencies throughout the entire range needed. A quantity of the original monochromatic light in beam 103 is bypassed directly to the photosensitive surface of detector 120 where it is heterodyned with the light focused upon the photo-detector by lens 119. Thus, a partial mirror 124 directs a reference beam of the light in beam 103 downwardly to a mirror or reflector 125 from which the beam is directed to another partial mirror 126 that, in turn, redirects the reference beam so that it is focused upon the active surface of photo-detector 120 by lens 119.

In order to reproduce a visual display from the signal developed by photo-detector 120 in FIG. 13, the system shown in FIGS. 14*a* and 14*b* may be utilized. As in FIG. 13, a beam of monochromatic light 130 is directed through a Bragg diffraction cell 131 in which acoustic waves launched by a transducer 132 are propagated across the light path. A source 134, across which transducer 132 is coupled, produces the composite signal that was developed by photo-detector 120 in FIG. 13. Consequently, the acoustic waves exhibit a spectrum that includes a plurality of individually unique frequencies that correspond to different rows of resonators in array 100.

The apparatus of FIG. 14*a* also includes a column 136 of photo-diodes 137 distributed in a pattern such that each diode corresponds to an entire row in array 100. Different portions of the light beam emerging from Bragg cell 131 are deflected at respective different angles corresponding to the particular frequencies present in the input signal from source 134. The optical system including Bragg cell 131 is such as to focus the resulting different bands of light upon the corresponding photosensitive devices 137 associated with the rows containing image elements to be reproduced. This is accomplished by including a spherical lens 138 in the path between cell 131 and array 136. As shown in FIG. 14*a* for illustrative purposes, the acoustic frequencies present are such as to deflect light into two beams individually illuminating the top and bottom rows. Finally, as carried on to FIG. 14*b*, each photosensitive device 137 is individually coupled, as by leads 140, to an associated bank of resonators in another resonator array 144.

In FIG. 14*b*, the remainder of the reproducing system will be seen to resemble closely that of FIG. 12 except that in this case a plurality of resonator banks are employed as in FIG. 13, so that the image elements contained in all of rows are simultaneously displayed. As in FIG. 13, only the end reeds 25*n* are illustrated, the remaining reeds in each bank being behind the plane of the drawing and the magnetic structure being omitted. Also as in that Figure, the reeds are mounted so as to deflect light they reflect back and forth as indicated by arrow 145.

Resonator array 144 is irradiated with collimated monochromatic light from a source 146 which projects the light through a partial mirror 147 upon the array. Light reflected by the individual resonators in array 144 is directed downwardly by mirror 147 through a spherical lens 148 around a "neutral" or zero-order stop 149. The light passing the stop then passes through another lens 150 to a sheet of ground glass 151 which defines the ultimate image plane. Stop 149 is a thin ribbon, as before, serving to block passage of those portions of the light which are reflected from the resonators in array 144 without any deflection.

Lenses 148 and 150 again constitute a one-to-one telescope. The optical system defined by equal-strength lenses 148 and 150 is such as to image the plane defined by array 144 upon the image plane in turn defined by ground glass sheet 151. Thus, with stop 149 spaced from lens 148 by the focal length F of the latter, lens 150 is spaced the same distance from stop 149 and ground glass sheet 151 is similarly spaced by the focal distance F from lens 150. The distance from array 144 to lens 148, by way of mirror 147, is also the focal distance F. The end result is that the entire image, as defined by rows and columns of different image elements and developed by the system of FIG. 13, is displayed on ground glass sheet 151 simultaneously.

It will be observed that, in all of the different embodiments discussed, each of the individual elements is in itself quite conventional. At the same time, many different analogous elements are known for accomplishing substantially equivalent functions. Accordingly, the essence of the present invention resides in the described combinations of elements, and numerous variations in the selection of particular elements are available. For example, reed-type resonators have been chosen for illustrative purposes by reason of their fundamental simplicity of operation at low frequencies. Alternatively, the resonator banks may be composed of series of thin metal diaphragms in which a spread of a frequency response is obtained by variation in diaphragm thickness. Such diaphragms again may be excited magnetically. The action of such diaphragms upon the illuminating light when excited into vibratory motion is primarily that of focusing and defocusing the incident light so as to achieve an effect which is fully analogous to the oscillatory deflection obtained by the use of resonant reeds as described. Similar optical rectification techniques may be employed as is described more fully in an article entitled "Probing of Acoustic Surface Perturbations by Coherent Light," by R. L. Whitman et an and which appared in APPLIED OPTICS, Vol. 8, pp. 1567–1576, Aug. 19, 1969. Moreover, whatever the particular type of resonant element employed, such as a reed or a diaphragm, the actual excitation of the vibratory motion may be induced directly by acoustic energy instead of by the use of magnetic flux or electric fields.

Knife edges and zero-order ribbon stops have been illustrated for the spatial filters because of their conventional nature. However, a linearly graded neutral density filter, in which the transmission of the filter varies in the direction of light deflection, may be substituted for a knife edge. Analogously, a spatial filter in which the density is a continuous function of distance, may be substituted for a ribbon stop.

In all of the different embodiments, a principal feature is that of using very simple resonator elements operative at a comparatively low frequency for the purpose of defining image element positions in a picture. The underlying technique is enhanced in the embodiments of FIGS. 10–14 wherein optical techniques are combined with mechanically resonant elements in a manner such that the signal processing that is included within a system, or between the different systems, occurs primarily only at comparatively low acoustic frequencies. In this connection, it is to be noted that the term "light" as employed herein is meant to include optical radiation in both the visible and invisible portions of the spectrum.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

I claim:

1. Image processing apparatus comprising:

a bank of frequency-responsive, light-reflective mechanical reed resonators individually responsive to signal energy of respective different frequencies and individually disposed at respective different positions;

image defining means having a plurality of image element locations in respective correspondence with said resonator positions and in individually interacting relation with said resonators;

and means for actively correlating the response of each of said resonators with image element intensity at the respective image element locations, including light source means for illuminating said bank of resonators so that light reflected from each resonator is periodically angularly deflected in response to resonator vibration, and means for spatially filtering the deflected light reflected from each resonator.

2. Image processing apparatus as defined in claim 1, in which said image defining means is disposed in the paths of the spatially filtered light reflected from said resonators for altering the light transmission in each light path in correspondence with the image brightness at the corresponding image element location.

3. Image processing apparatus as defined in claim 2, which further includes means for energizing said resonators with signal energy having components of said different frequencies, and photosensitive means responsive to the light altered by said image defining means for developing an electric output signal.

4. Image processing apparatus as defined in claim 1, which further includes means for energizing said resonators with signal energy having components of said different frequencies, and in which said correlating means further includes means transmissive of said reflected light for optically imaging said resonators upon an image plane corresponding to that occupied by said image defining means.

5. Image processing apparatus as defined in claim 1, which includes means for energizing said resonators with a signal whose frequency components represent different image element positions, in which said correlating means further includes means transmissive of said reflected light for optically imaging said resonators upon an image plane corresponding to that occupied by said image defining means, and in which said image defining means responds to said spatially filtered light reflected from said resonators for creating an image in which a representation of said signal is visually displayed across said image element locations.

6. Image processing apparatus as defined in claim 1, which includes a plurality of said banks of resonators disposed in a row and column array with the resonators in each row being individually responsive to signal energy of different frequencies for exhibiting physical movement, and means for energizing said resonators with signal energy including components of said different frequencies.

7. Image processing apparatus as defined in claim 6, in which said light source includes means for developing a plurality of bands of light each focused upon a different row of resonators in said array, in which said image defining means is disposed in the paths of the spatially filtered light reflected from said resonators for individually altering the light transmission in each light path in correspondence with the image brightness at corresponding image element locations;

and which further includes photosensitive means responsive to the light altered by said image defining means for developing an electric output signal.

8. Image processing apparatus as defined in claim 7, which comprises means for deriving a reference light beam from said source and for directing it to said photosensitive means in juxtaposition with the light altered by said image defining means for optical heterodyning therewith.

9. Image processing apparatus as defined in claim 8, in which said light band developing means includes a source of monochromatic light and diffraction means for propagating across the path of said monochromatic light acoustic waves having a spectrum including a plurality of unique frequencies respectively assigned to the different rows in said array to deflect different portions of said monochromatic light at different angles.

10. Image processing apparatus as defined in claim 8, in which said apparatus includes an optical system for imaging the plane, from which said bands of light are focused, upon said spatial filtering means and for imaging the plane of said array upon said image defining means.

11. Image processing apparatus as defined in claim 6, in which said energizing means includes a plurality of photosensitive devices distributed in a predetermined pattern and each coupled to a different row of said resonators, and means for individually irradiating said devices with respective light quantities each including different frequencies of said signal energy.

12. Image processing apparatus, comprising:

a bank of spatially separated, frequency-responsive, light-reflective reed resonators;

means for exciting said resonators with mechanical energy of respective different frequencies and substantially uniform intensity;

light source means generating a light beam for uniformly illuminating said bank of resonators;

an image storage medium having individual portions effectively disposed adjacent to and associated with respective resonators in said bank for defining selected image elements; and photodetecting means for detecting said light beam after interaction with said medium to develop an electrical signal, the frequency content of which characterizes the information stored on said medium.

13. Image processing apparatus, comprising:

a row-column matrix of frequency-responsive, light-reflective mechanical resonators, the resonators in each row having mutually different resonant frequencies;

light source means for generating a coherent light beam for illuminating said matrix of resonators;

an acousto-optic Bragg cell including a sound-propagative, light-transmissive medium and electro-acoustic transducer means coupled to said medium for Bragg diffracting said beam before impingement upon said matrix of resonators;

first means for energizing said cell to control the illumination of said matrix of resonators; and second means for controlling the energization of said resonators with signals having frequencies corresponding to the frequencies of resonance of said resonators, each resonator in said matrix having a column address identifiable with light of a particular optical frequency and a row address corresponding to a particular resonator frequency.

14. The apparatus defined by claim 13 wherein said first means generates a spectrum of acoustic frequencies to effect a simultaneous two-dimensional illumination of said matrix of resonators.

15. The apparatus defined by claim 14 including optical imaging means for forming an image of said matrix of said resonators at an image location and spatial filter means for blocking light reflected from unexcited resonators while passing light from excited resonators, and wherein said second means develops an electrical video signal for energizing said resonators in an imagewise distribution, whereby an optical display representing said video signal is developed at said image location.

16. The apparatus defined by claim 13 wherein said first means generates a progression of acoustic frequencies to cause said beam to illuminate successive rows of said resonators.

17. The apparatus defined by claim 16 including optical imaging means for forming an image of said matrix of said resonators at an image location and spatial filter means for blocking light reflected from unexcited resonators while passing light from excited resonators, and wherein said second means develops an electrical video signal for energizing said resonators in an image-wise distribution, whereby an optical display representing said video signal is developed at said image location.

* * * * *